United States Patent [19]

Peterson

[11] Patent Number: 5,123,018
[45] Date of Patent: Jun. 16, 1992

[54] MICROPRESSOR MONITORING AND RESETTING CIRCUIT

[75] Inventor: Gregory Peterson, Hoffman Estates, Ill.

[73] Assignee: Digital Appliance Controls, Inc., Elgin, Ill.

[21] Appl. No.: 446,138

[22] Filed: Dec. 5, 1989

[51] Int. Cl.⁵ .............................................. G06F 11/00
[52] U.S. Cl. .................................................. 371/16.3
[58] Field of Search ..................... 371/16.3, 12, 62; 364/200, 900

[56] References Cited

U.S. PATENT DOCUMENTS

| | | | |
|---|---|---|---|
| 4,488,303 | 12/1984 | Abramovich | 371/62 |
| 4,541,050 | 9/1985 | Honda | 371/16.3 X |
| 4,586,179 | 4/1986 | Sirazi | 371/16.3 |
| 4,625,309 | 11/1986 | Nitschke | 371/16.3 |
| 4,868,817 | 9/1989 | Shigihara | 371/62 X |
| 4,879,647 | 11/1989 | Yazawa | 371/16.3 X |
| 4,964,123 | 10/1990 | Umemoto | 371/16.3 X |

Primary Examiner—Robert W. Beausoliel
Attorney, Agent, or Firm—Douglas B. White

[57] ABSTRACT

There is provided an efficient circuit which monitors micropressor operation and directs a reset signal to the microprocessor in the event of malfunction. The status monitor circuit operates by maintaining a capacitor charge with a status pulse from the microprocessor. The base of a transistor is controlled by this charged capacitor, such that the transistor switches OFF when the charge is drained and the absence of a status signal is indicated. When the transistor is switched OFF a reset pulse is enabled to the microprocessor. To provide the reset signal, a transformed AC line voltage is applied to the base of a second transistor to switch it ON and OFF in synchronization with the line frequency.

6 Claims, 1 Drawing Sheet

MICROPRESSOR MONITORING AND RESETTING CIRCUIT

BACKGROUND OF THE INVENTION

1. Field of the Invention

The invention relates generally to microprocessor based systems and more particularly to the detection of abnormal operating conditions and reinitiation of normal operation.

2. Description of the Prior Art

During the operation of a microprocessor an interrupt in power or system malfunction requires the restart of the system. A reset terminal on the microprocessor provides the necessary toggle to restart the system, and numerous prior art techniques have been presented to sense system malfunction and reset the microprocessor.

One of such prior art techniques is presented in U.S. Pat. No. 4,586,179 which monitors a microprocessor output terminal for a status signal and activates a reset trigger on failure of the status signal. Additionally, the reset trigger is initiated on sensing of a supply voltage drop. To accomplish these objectives, the microprocessor status signal is processed through a complicated circuit including a timing circuit and a triggering transistor to pulse the microprocessor reset pin. A voltage separate sensitive circuit is also used to reset the timing counters and in that fashion, to activate the triggering transistor and reset the microprocessor following detection of low voltage.

SUMMARY OF THE INVENTION

An efficient circuit is presented herein in which both a microprocessor status signal and the supply voltage are monitored, and a reset signal is directed to the microprocessor in the event of malfunction. The status monitor circuit operates by maintaining a capacitor charge with the microprocessor status signal. The base of a transistor is controlled by this charged capacitor, such that the transistor switches OFF when the charge is drained and indicates the absence of a status signal. When this transistor is switched OFF a reset pulse is enabled to the microprocessor.

To provide the reset signal, a transformed AC line voltage is applied to the base of a second transistor to switch it ON and OFF in synchronization with the line frequency, producing a periodic reset signal. Whenever the status monitor transistor is switched OFF, the reset signal is enabled to the reset terminal of the microprocessor. This will occur at start-up before the charging capacitor has fully charged, during operation on failure of the monitor capacitor to receive a timely status signal, or on temporary power failure where the capacitor discharges.

Figure 1:
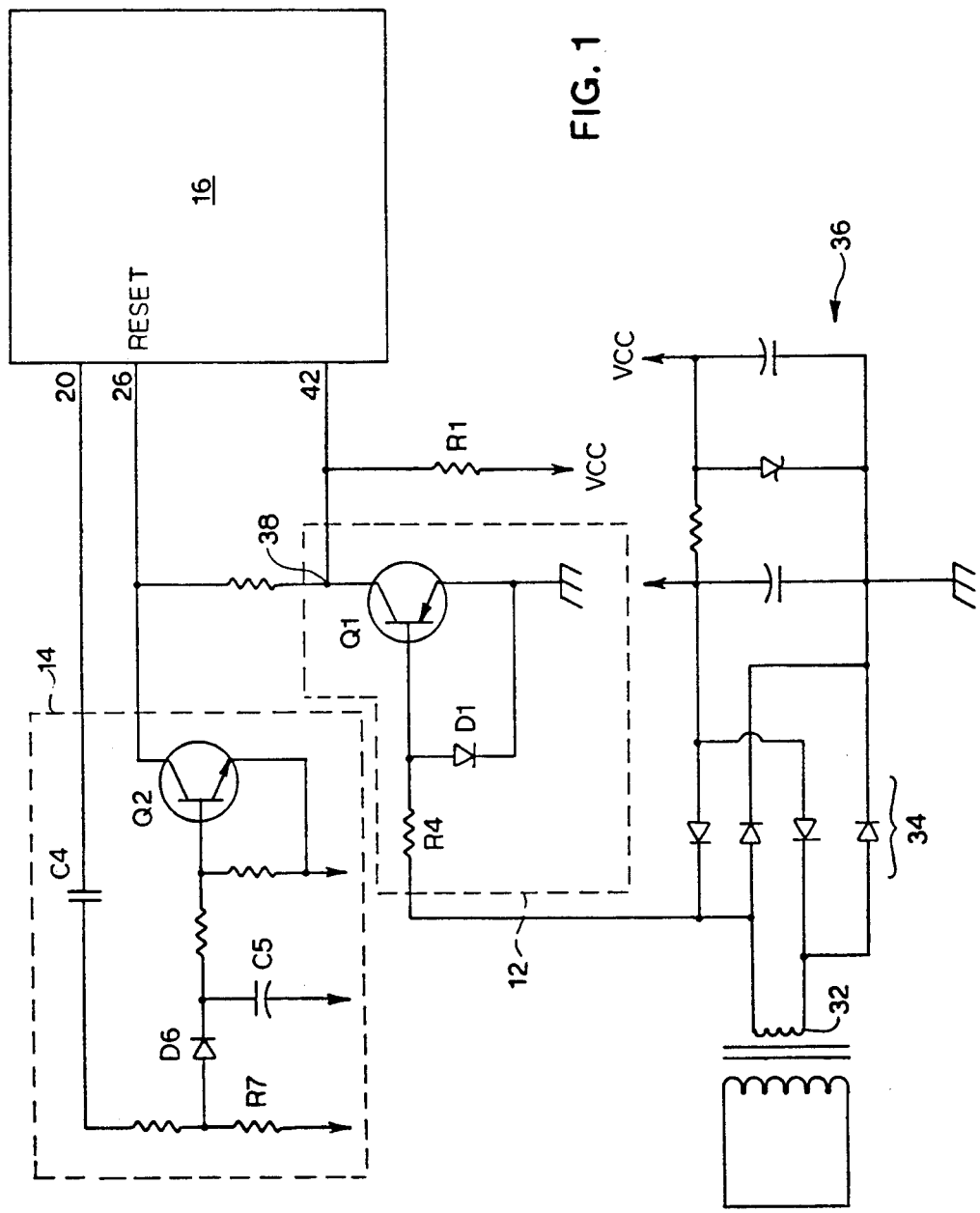
FIG. 1 is a schematic of the monitor and reset circuit of the present invention.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims and in accordance with the doctrine of equivalents.

DESCRIPTION OF THE PREFERRED EMBODIMENT

The monitor and reset circuit shown in FIG. 1 includes a pulse generating circuit, indicated generally by the numeral 12, and reset controlling circuitry, indicated generally by numeral 14. A microprocessor 16 operates to provide a status signal on its output pin 20 and to receive reset signals on its reset input 26. The status signal is a periodic pulse generated as a result of the programming of the microprocessor and is directed to this output pin in accordance with methods well known in the art.

The power supply for the appliance circuitry is shown as that portion indicated generally by the numeral 30 and consists essentially of a transformer 32, a rectifier 34 and filter 36. A DC voltage Vcc is available from this conversion circuit to power the microprocessor and associated circuitry. A transformed AC voltage is taken from the transformer and used to generate a periodic pulse, which in this case will be at the line frequency. The transformed AC is fed to transistor $Q_1$ through base resistor $R_4$ with diode $D_1$ providing overvoltage protection. As a result, transistor $Q_1$ switches OFF and ON in synchronization with the line frequency to generate a periodic pulse at its collector 38. The line frequency is detected and measured by the microprocessor using these pulses, and the reset signal to the microprocessor is also developed from these pulses.

The reset of the microprocessor is achieved by connecting the collector of the pulse generating transistor $Q_1$ to the reset terminal 26 of the microprocessor. At any time the power is ON a reset pulse will be directed to the microprocessor, unless the pulsing is disabled. At the same time, this generated pulse is directed to a microprocessor input 42 where the frequency may be detected and measured through well known programming techniques.

Control of the reset pulse is provided by transistor $Q_2$ which, when turned ON, pulls its collector to Vcc and inhibits the pulse at the reset pin. The ON/OFF condition of transistor $Q_2$ is affected by the charge status of capacitor $C_5$; when it is charged the transistor is kept turned ON and the pulses are inhibited, and when it is discharged the transistor is switched OFF to enable reset pulses to the reset pin.

The charge status of the ON/OFF controlling capacitor $C_5$ is affected by the supply voltage Vcc as well as the periodic status pulse from the microprocessor. The charge of capacitor $C_5$ is maintained by feeding the status pulse to capacitor $C_5$ through the coupling capacitor $C_4$ and the rectifying circuit (diode $D_6$ and resistor $R_7$) to charge capacitor $C_5$ only when the monitored port is regularly pulsed by the microprocessor. Consequently, transistor $Q_2$ will stay ON and inhibit reset pulses only as long as capacitor $C_5$ remains charged. But in the absence of normal supply voltage or in the event of interruption of processing, the capacitor $C_5$ will discharge and reset pulses from transistor $Q_1$ will be enabled to the reset pin.

The efficient operation of this circuit is exemplified by reference to the three (3) principal conditions: initial power-up, ongoing microprocessor operation, and upon the disturbance of the normal operation. On initial power-up, the capacitor $C_5$ is discharged and transistor $Q_2$ is OFF. Upon application of power line frequency to $Q_1$, reset pulses are generated and the reset pin is pulled to ground for one-half of the line cycle, causing a microprocessor reset. During the other half of the cycle, the reset pin is pulled to Vcc through resistor $R_1$ to cause the microprocessor to come out of reset and begin program execution.

Once the microprocessor starts execution of its programming, it begins pulsing the output port 20 to charge capacitor $C_5$ and turn ON the transistor $Q_2$. When $Q_2$ turns ON, the pulses from $Q_1$ can no longer cause the reset. During normal operation, the status pulses will maintain $Q_2$ in the ON state and the reset will be inhibited.

Upon an interruption in the normal operation, capacitor $C_5$ will discharge and transistor $Q_2$ will switch OFF. When $Q_1$ is subsequently driven ON by the line frequency, it will toggle the reset pin.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A reset circuit for a microprocessor having a reset terminal and an output terminal comprising:
    pulse means coupled to an oscillating power line signal for generating a periodic pulse responsive to said power line signal, said pulse means being coupled to the reset terminal of the microprocessor to provide a periodic reset signal thereto; and
    pulse enabling means coupled to an output of the microprocessor to receive a status signal therefrom and to enable a reset signal from said pulse means in the absence of said status signal, wherein said pulse enabling means comprises a capacitor charging circuit connected to charge a capacitor in response to said status signal and coupled to the base of a transistor to maintain said transistor in its ON state as long as said capacitor remains charged, and wherein the collector of said transistor is coupled to said pulse means to inhibit said reset signal when said transistor is in its ON state.

2. The reset circuit for a microprocessor of claim 1 wherein said pulse means comprises means for converting an AC power line signal into periodic pulses.

3. The reset circuit for a microprocessor of claim 2 wherein said pulse means comprises a transistor having its base coupled to the AC power line to switch said transistor in synchronization with the AC power line signal and produce pulse signals at its collector in response thereto.

4. The reset circuit for a microprocessor of claim 3 wherein said capacitor charging circuit comprises a rectifying circuit arranged to rectify said status signal and charge said capacitor therewith.

5. The reset circuit for a microprocessor of claim 2 wherein said capacitor charging circuit comprises a rectifying circuit arranged to rectify said status signal and charge said capacitor therewith.

6. The reset circuit for a microprocessor of claim 1 wherein said capacitor charging circuit comprises a rectifying circuit arranged to rectify said status signal and charge said capacitor therewith.

* * * * *